(12) United States Patent
Stephens et al.

(10) Patent No.: US 11,440,123 B2
(45) Date of Patent: Sep. 13, 2022

(54) TORCH HANDLE INCLUDING PNEUMATICALLY OPERATED JAW

(71) Applicant: Victor Equipment Company, Chesterfield, MO (US)

(72) Inventors: Michael E. Stephens, The Colony, TX (US); Jeffrey S. Henderson, Corinth, TX (US)

(73) Assignee: VICTOR EQUIPMENT COMPANY, Chesterfield, MO (US)

( * ) Notice: Subject to any disclaimer, the term of this patent is extended or adjusted under 35 U.S.C. 154(b) by 1075 days.

(21) Appl. No.: 15/426,598

(22) Filed: Feb. 7, 2017

(65) Prior Publication Data

US 2017/0144244 A1  May 25, 2017

Related U.S. Application Data

(63) Continuation-in-part of application No. PCT/US2015/048886, filed on Sep. 8, 2015.

(51) Int. Cl.
*B23K 9/28* (2006.01)
*B23K 9/013* (2006.01)
*B23K 9/173* (2006.01)

(52) U.S. Cl.
CPC .............. *B23K 9/282* (2013.01); *B23K 9/013* (2013.01); *B23K 9/173* (2013.01); *B23K 9/28* (2013.01); *B23K 9/287* (2013.01)

(58) Field of Classification Search
CPC ........ B23K 9/282; B23K 9/013; B23K 9/173; B23K 9/28; B23K 9/287

(Continued)

(56) References Cited

U.S. PATENT DOCUMENTS 2,394,204 A   2/1946  Randall
2,397,519 A   4/1946  Anthony
(Continued)

FOREIGN PATENT DOCUMENTS

CN   1137767 A   12/1996
CN   1363443 A   8/2002
(Continued)

OTHER PUBLICATIONS

Notice of Preliminary Rejection with English translation for Korean Patent Application No. 10-2018-7006088 dated Feb. 8, 2019, 13 pages.

(Continued)

*Primary Examiner* — Jimmy Chou
(74) *Attorney, Agent, or Firm* — Edell, Shapiro & Finnan, LLC (57) ABSTRACT

Approaches herein provide a torch handle including a pneumatically controlled jaw operable to engage an electrode. In one approach, a system is provided for distributing gas within the torch handle, the system including a pneumatic cylinder within a main housing of the torch handle. The pneumatic cylinder is coupled to a shaft for actuating first and second members of the jaw. The system further includes a gas passageway through the main housing, the gas passageway extending to an exit orifice disposed within the second member. A flow controller, including first and second valves, is operable to direct a flow of a gas to either the pneumatic cylinder or the gas passageway. In one approach, the first member is actuated towards the second member when the gas is directed through the gas passageway, and actuated away from the second member when the gas is directed to the pneumatic cylinder.

10 Claims, 11 Drawing Sheets

(58) Field of Classification Search
USPC .... 219/59.1, 70, 72, 75, 69 R, 68, 144, 139, 219/60 A, 125.11, 137.63, 61
See application file for complete search history.

(56) References Cited

U.S. PATENT DOCUMENTS

| | | | | |
|---|---|---|---|---|
| 2,422,812 | A * | 6/1947 | Wachter | B23K 9/282 219/144 |
| 2,721,248 | A * | 10/1955 | Kirkpatrick | B23K 9/0286 219/60 A |
| 2,784,293 | A | 3/1957 | Adams | |
| 2,949,528 | A | 8/1960 | Bernard et al. | |
| 2,990,468 | A | 6/1961 | Mankouski | |
| 3,293,402 | A | 12/1966 | Graham | |
| 3,461,265 | A * | 8/1969 | Spiro | B23K 9/0286 219/60 R |
| 3,659,072 | A * | 4/1972 | Carkhuff | B23K 9/28 219/70 |
| 3,688,069 | A * | 8/1972 | Kazlauskas | B23K 9/0286 219/60 A |
| 3,717,744 | A | 2/1973 | Pishioneri | |
| 3,828,156 | A * | 8/1974 | Fulks | B23K 9/0282 219/60 A |
| 4,038,509 | A * | 7/1977 | Henderson | B23K 9/0282 219/60 A |
| 4,761,531 | A * | 8/1988 | Moss | B23K 9/282 219/70 |
| 4,810,849 | A * | 3/1989 | Heideman | B23K 11/314 188/285 |
| 4,873,412 | A * | 10/1989 | Vinczer | B23K 9/206 219/95 |
| 5,160,821 | A * | 11/1992 | Oakley | B23K 7/102 219/121.39 |
| 5,223,686 | A * | 6/1993 | Benway | B23K 9/0286 219/125.11 |
| 5,679,271 | A * | 10/1997 | Guerrina | B23K 11/066 219/60 A |
| 5,710,403 | A * | 1/1998 | Jusionis | B23K 9/0286 219/60 A |
| 6,121,567 | A * | 9/2000 | Guerrina | B23K 11/066 219/60 A |
| 6,380,505 | B1 * | 4/2002 | Stoops | B23K 37/0533 219/60 A |
| 6,459,062 | B1 * | 10/2002 | Guerrina | B23K 37/0533 219/60 A |
| 6,683,273 | B2 * | 1/2004 | Conway | H01R 13/005 219/121.48 |
| 6,713,711 | B2 * | 3/2004 | Conway | H05H 1/3423 219/121.48 |
| 6,773,304 | B2 * | 8/2004 | Conway | H05H 1/34 439/595 |
| 7,041,935 | B2 * | 5/2006 | Raymond | F16L 57/02 219/121.48 |
| 7,429,715 | B2 * | 9/2008 | MacKenzie | H05H 1/3423 219/121.51 |
| 9,148,943 | B2 | 9/2015 | Beliveau et al. | |
| 2006/0191907 | A1 * | 8/2006 | Henley | B23K 37/006 219/617 |
| 2007/0210047 | A1 * | 9/2007 | Child | B23K 37/0533 29/890.141 |
| 2008/0128398 | A1 * | 6/2008 | Schneider | B23K 9/28 219/141 |
| 2010/0051586 | A1 * | 3/2010 | Guerrina | B23K 9/0286 219/59.1 |
| 2011/0247999 | A1 * | 10/2011 | Ihde | B23K 9/323 219/74 |
| 2012/0248083 | A1 * | 10/2012 | Garvey | B23K 9/133 219/137.7 |
| 2013/0196274 | A1 * | 8/2013 | McComb | B23K 9/0061 431/158 |
| 2014/0110382 | A1 | 4/2014 | Beliveau et al. | |
| 2017/0144244 | A1 * | 5/2017 | Stephens | B23K 9/282 |

FOREIGN PATENT DOCUMENTS

| | | |
|---|---|---|
| CN | 103008856 A | 4/2013 |
| CN | 203621714 U | 6/2014 |
| EP | 2255916 A1 | 12/2010 |

OTHER PUBLICATIONS

Notification of Transmittal of International Search Report and Written Opinion including International Search Report and Written Opinion for International Application No. PCT/US2018/015843 dated Apr. 19, 2018, 13 pages.
International Preliminary Report on Patentability for International Application No. PCT/US2015/048886 dated Mar. 13, 2018, 6 pages.
International Search Report and Written Opinion from PCT/US2015/048886 dated Nov. 27, 2015, 11 pages.
Extended European Search Report for European Patent Application No. 15903712.6-1016 dated Jun. 12, 2019, 7 pages.
International Preliminary Report on Patentability and Written Opinion of the International Searching Authority in International Application No. PCT/US2018/015843, dated Aug. 22, 2019, 7 pages.
Brazilian Office Action in corresponding Brazilian Patent Application No. BR112018003156-9, dated Aug. 20, 2019, 6 pages with English Translation.
Chinese Office Action in corresponding Chinese patent application No. 201580082967.1, dated Aug. 2, 2019, 18 pages with English translation.
Office Action from Canadian Intellectual Property Office for corresponding Canadian Patent Application No. 2,996,026 dated Nov. 21, 2019, 4 pages.
Examination Report No. 1 for Australian Application No. 2015408749 dated Apr. 24, 2020, 3 pages.
Examination Report No. 1 for Australian Application No. 2019226275 dated May 23, 2020, 5 pages.
Office Action for U.S. Appl. No. 15/896,240 dated Dec. 20, 2019, 6 pages.
Office Action for Chinese Patent Application No. 201580082967.1 dated Mar. 12, 2020, 19 pages.

* cited by examiner

TORCH HANDLE INCLUDING PNEUMATICALLY OPERATED JAW

BACKGROUND OF THE DISCLOSURE

Field of the Disclosure

The present disclosure relates generally to a gouging torch. More particularly, the present disclosure relates to a gouging torch having a torch handle with a pneumatically operated jaw.

Discussion of Related Art

Air carbon-arc systems and processes may be used in a wide variety of applications, such as metal fabrication and casting finishing, chemical and petroleum technology, construction, mining, general repair, and maintenance. With respect to metal fabrication and casting finishing, air carbon-arc metal removing systems and processes may be used to gouge, groove, cut, or flush metal from a surface.

An air carbon-arc cutting and gouging torch may operate by positioning an electrode relative to a workpiece so that an electric arc can be struck and maintained between the electrode and the workpiece. As metal melts under the influence of the arc, a stream of high-pressure air directed along the electrode to the arc causes the molten metal to be forcibly removed from the influence of the arc, thus leaving a groove or gouge in the surface of the workpiece. The process can also be used to cut completely through the workpiece in the area traversed by the electrode and the arc.

The electrodes of the gouging torch exhibit wear, however, and must be periodically replaced. Current art approaches use manual gouging torch levers to open and close a jaw of the torch for carbon electrode insertion and repositioning. This leads to operator fatigue, especially over a large number of cycles, as the hand gripping force necessary on the gouging torch lever may be significant.

SUMMARY OF THE DISCLOSURE

Exemplary approaches herein provide a torch handle including a pneumatically controlled jaw operable to engage an electrode. In one approach, a system is provided for distributing gas within the torch handle, the system including a pneumatic cylinder disposed within a main housing of the torch handle. The pneumatic cylinder may include a piston coupled to a shaft for actuating a first member of a jaw relative to a second member of the jaw. The system further includes a gas passageway through the main housing, the gas passageway including an exit orifice disposed within the second member of the jaw. A flow controller is operable to control a flow of gas and direct it to either the pneumatic cylinder or the gas passageway. In one approach, the first member is actuated towards the second member when the flow of gas is directed through the gas passageway, and actuated away from the second member when the flow of gas is directed to the pneumatic cylinder. By providing a pneumatically assisted jaw, the hand gripping force typically required for operating the gouging torch lever may be greatly reduced.

An exemplary torch handle in accordance with the present disclosure includes a main housing, and a jaw coupled to the main housing, wherein the jaw includes a first member and a second member operable to engage an electrode. The torch handle further includes a pneumatic cylinder disposed within the main housing, wherein the pneumatic cylinder is coupled to an arm for actuating the first member relative to the second member. The torch handle further includes a gas passageway extending through the main housing to an exit orifice disposed within the second member, and a valve assembly including a first valve operable to deliver a gas to the pneumatic cylinder and a second valve operable to deliver the gas to the gas passageway, wherein the first and second valves are oriented substantially perpendicular to one another.

An exemplary system for distributing gas within a torch handle in accordance with the present disclosure includes a pneumatic cylinder disposed within a main housing, the pneumatic cylinder including a shaft for actuating a first member of a jaw relative to a second member of the jaw. The system further includes a gas passageway through the main housing, the gas passageway including an exit orifice disposed within the second member of the jaw. The system further includes a valve assembly including a first valve operable to deliver a gas to the pneumatic cylinder and a second valve operable to deliver the gas to the gas passageway, wherein the first and second valves are oriented substantially perpendicular to one another.

An exemplary method for operating a torch handle in accordance with the present disclosure includes receiving a flow of a gas at a flow controller of a torch handle, the flow controller including a valve assembly having first and second valves oriented substantially perpendicular to one another. The method further includes directing the gas to either of the following: a pneumatic cylinder disposed within a main housing of the torch handle via the second valve, wherein the pneumatic cylinder includes a shaft for actuating a first member of a jaw, and a gas passageway through the main housing via the first valve, wherein the gas passageway includes an exit orifice disposed within a second member of the jaw. The method further includes actuating the first member of the jaw relative to the second member.

BRIEF DESCRIPTION OF THE DRAWINGS

The accompanying drawings illustrate exemplary approaches of the disclosed torch handle including a pneumatically operated jaw so far devised for the practical application of the principles thereof, and in which:

FIG. 6-A is an isometric partial cutaway view of the torch handle of FIG. 1 according to an exemplary approach;

FIG. 6-B is a side cutaway view of the torch handle of FIG. 1 according to an exemplary approach;

FIG. 7-A is a semitransparent, isometric partial cutaway view of the torch handle of FIG. 1 according to an exemplary approach;

FIG. 7-B is a semitransparent, side cutaway view of the torch handle of FIG. 1 according to an exemplary approach.

DESCRIPTION OF EMBODIMENTS

The present disclosure will now proceed with reference to the accompanying drawings, in which various approaches are shown. It will be appreciated, however, that the disclosed torch handle may be embodied in many different forms and should not be construed as limited to the approaches set forth herein. Rather, these approaches are provided so that this disclosure will be thorough and complete, and will fully convey the scope of the disclosure to those skilled in the art. In the drawings, like numbers refer to like elements throughout.

As used herein, an element or operation recited in the singular and proceeded with the word "a" or "an" should be understood as not excluding plural elements or operations, unless such exclusion is explicitly recited. Furthermore, references to "one approach" of the present disclosure are not intended to be interpreted as excluding the existence of additional approaches that also incorporate the recited features.

Furthermore, spatially relative terms, such as "beneath," "below," "lower," "central," "above," "upper," and the like, may be used herein for ease of describing one element's relationship to another element(s) as illustrated in the figures. It will be understood that the spatially relative terms may encompass different orientations of the device in use or operation in addition to the orientation depicted in the figures.

Figure 1:
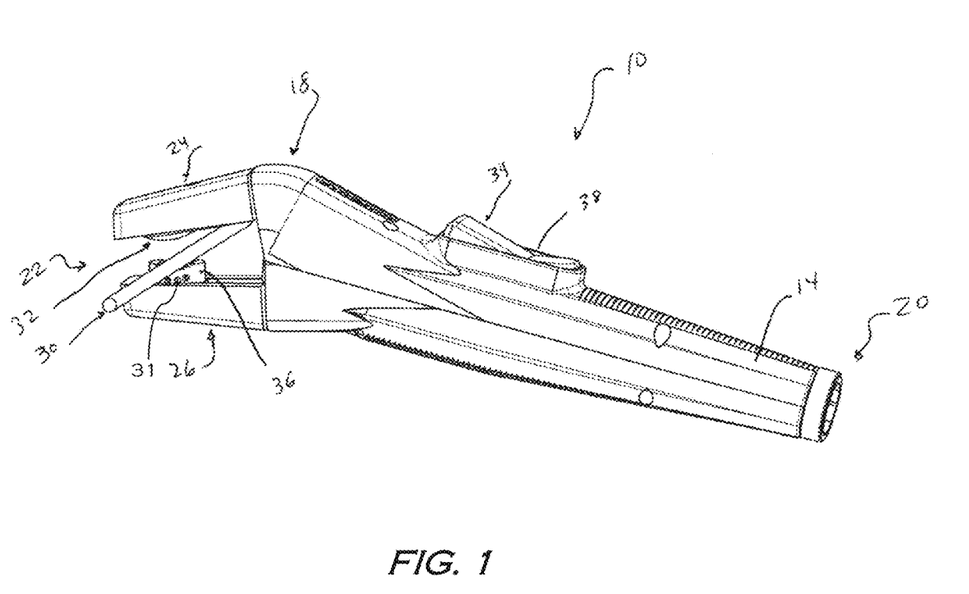
FIG. 1 is an isometric view of a torch handle according to an exemplary approach.

Referring now to FIG. 1, a torch handle 10 of a gouging torch according to exemplary embodiments will be described in greater detail. As shown, the torch handle 10 includes a main housing 14, which may include one or more pieces assembled together and suitably shaped to be held in a hand of an operator. The torch handle 10 further includes a jaw 22 coupled at a distal end 18 of the main housing 14. Although not shown, the torch handle 10 includes a torch body disposed within the main housing 14 at a proximal end 20 thereof. In one embodiment, the torch handle 10 and the jaw are made of a heat resistant material such as a glass-filled phenolic.

In an exemplary embodiment, the jaw 22 includes a first member 24 disposed opposite a second member 26. Together the first member 24 and the second member 26 may operate to engage an electrode 30 therebetween. In exemplary embodiments, the jaw 22 may be user-controlled via a switch 34 that is partially recessed within an opening 38 of the main housing 14. More specifically, the switch 34 may operate with a flow controller within the main housing 14 to provide pneumatically assisted user-control of the jaw 22, as will be further described below.

In exemplary embodiments, the first member 24 includes a protrusion 32 configured to make contact with the electrode 30 when the jaw 22 is in a closed position. The second member 26 includes a nozzle 36 having a groove formed therein to receive the electrode 30. The nozzle 36 may be free to move with the movement of electrode 30. Nozzle 36 is provided with a plurality of orifices 31 from which flows a high velocity gas stream which performs the cutting or gouging action. The pressure of gas required to perform the work varies, but usually this torch operates from a gas source having a pressure of from about 80 to about 100 psi.

Figure 2:
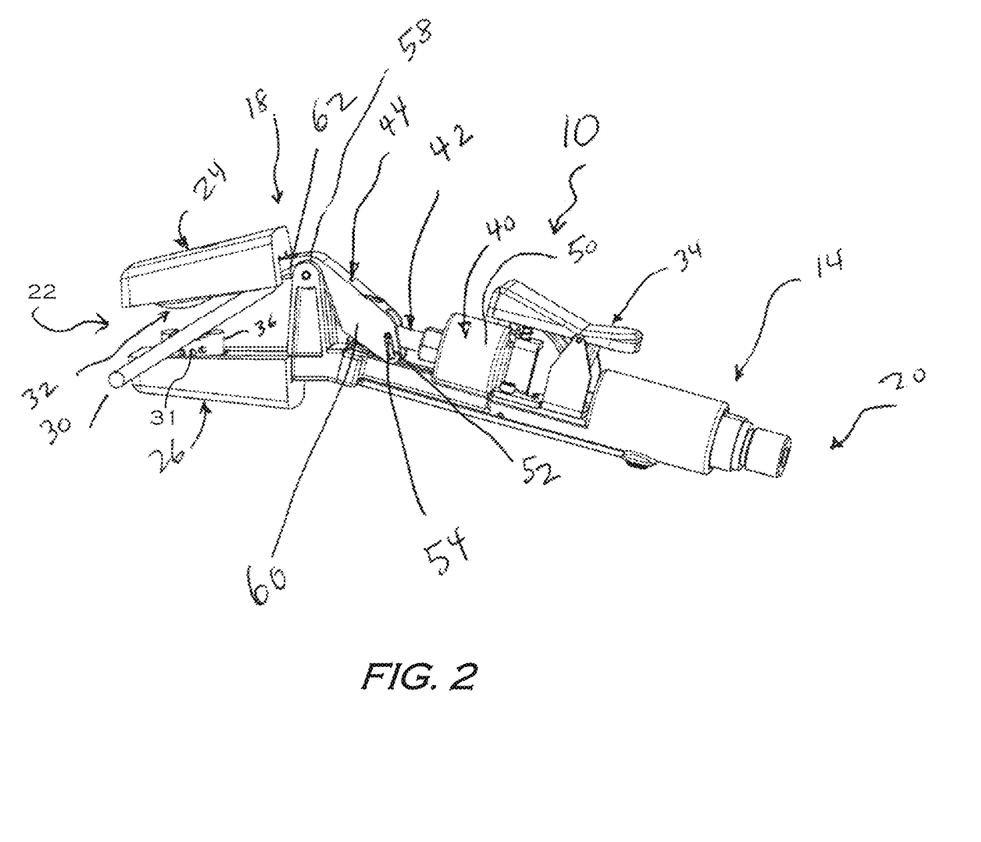
FIG. 2 is an isometric partial cutaway view of the torch handle of FIG. 1 according to an exemplary approach.
Figure 3A:
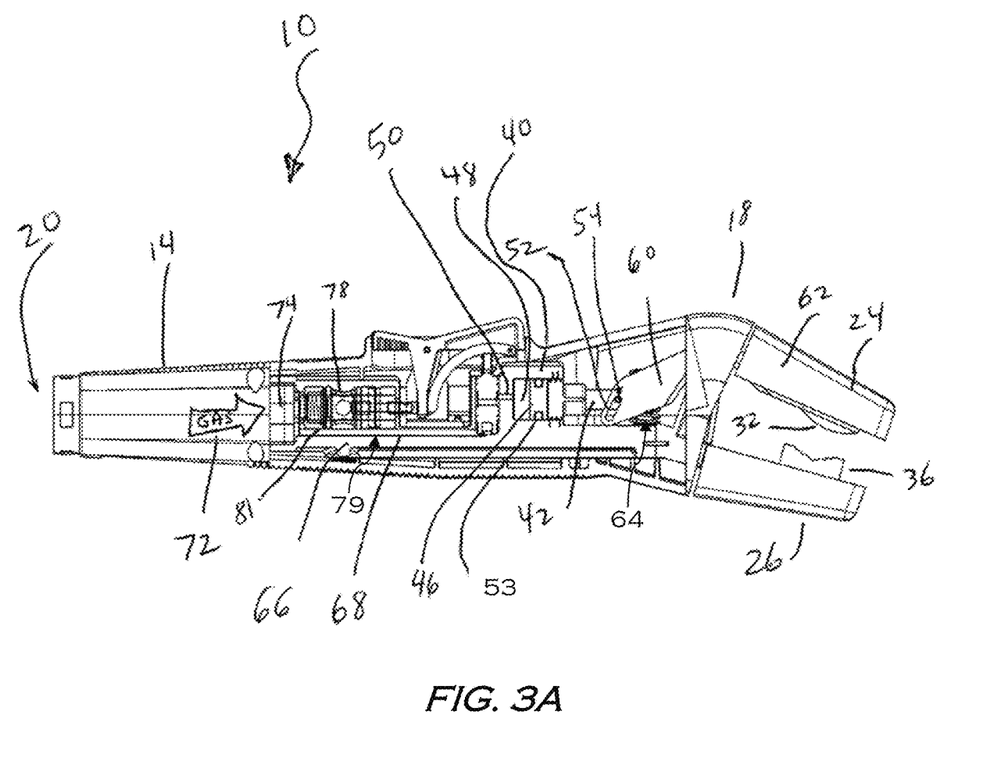
FIG. 3A is a side cutaway view of the torch handle of FIG. 1 according to an exemplary approach.
Figure 3B:
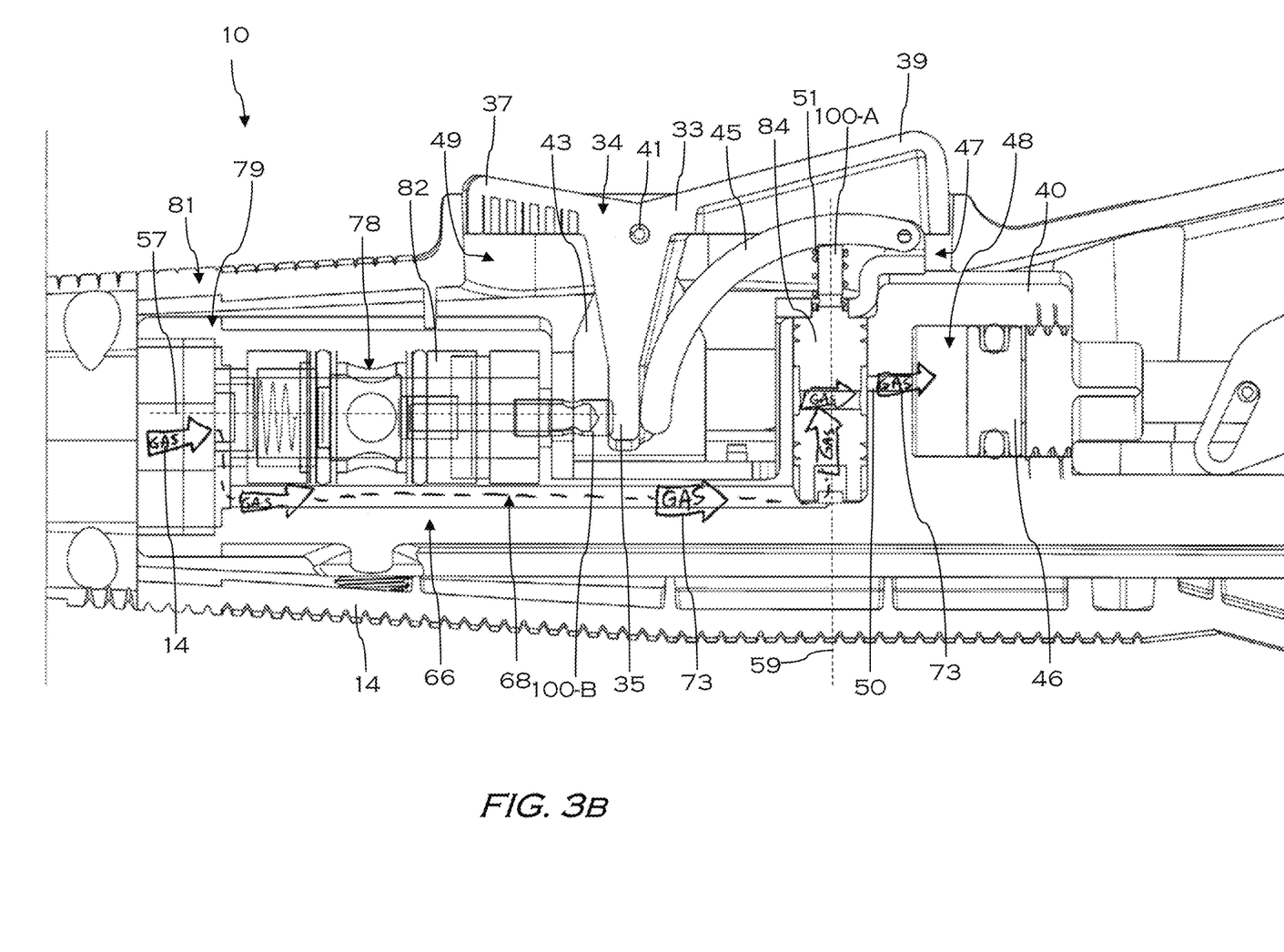
FIG. 3B is a close-up side cutaway view of the torch handle of FIG. 1 according to an exemplary approach.

Referring now to FIGS. 2-3B, the torch handle 10 according to exemplary embodiments will be described in greater detail. As shown, the torch handle 10 includes a pneumatic cylinder 40 disposed within the main housing 14. The pneumatic cylinder 40 includes a shaft 42 coupled to an arm 44 at a first end, and to a piston 46 disposed within a chamber 48 at a second end. In exemplary embodiments, the piston 46 is configured to slide within the chamber 48 in response to a flow of gas through a pneumatic cylinder inlet 50. The piston 46 may include one or more O-rings 53 extending around a circumference thereof to create a seal between the piston 46 and the walls of the chamber 48.

In various embodiments, the pneumatic cylinder 40 may differ in appearance, size and function depending upon the type of pneumatic cylinder employed. For example, in one embodiment, a single-acting cylinder (SAC) may use the pressure imparted by compressed air to create a driving force in one direction, while a spring is used to return the piston 46 to its original position. In another embodiment, a double-acting cylinder may use the force of air to move the piston 46 in both directions. The cylinder may have two ports to allow air into the cylinder, one for outstroke and one for instroke. In yet another embodiment, a multi-stage, telescoping cylinder, which may be either single or double-acting, incorporates a piston rod nested within a series of hollow stages of increasing diameter. Upon actuation, the piston rod and each succeeding stage "telescopes" out as a segmented piston. This allows for a longer stroke than would be achieved with a single-stage cylinder of the same collapsed length.

As further shown, the arm 44 includes one or more slots 52 for slidably receiving a radial pin 54 of the shaft 42. In exemplary embodiments, the arm 44 includes a first section 60 disposed within the main housing 14, and a second section 62 coupled to the first member 24 of the jaw 22. During operation, the arm 44 may pivot about a fulcrum 58 in response to movement of the radial pin 54 within the slot 52. For example, when the shaft 42 is urged by the piston 46 towards the distal end 18 of the main housing 14, the radial pin 54 is positioned at a top end the slot 52, which causes the first section 60 of the arm 44 to move downward in a direction generally transverse to the linear movement of the piston 46, and the second section 62 of the arm 44 to move upwards away from the electrode 30. Inversely, when the shaft 42 is retracted towards the proximal end 20 of the main housing 14, the radial pin 54 is positioned at a bottom end of the slot 52, which causes the first section 60 of the arm to move upwards in the direction generally transverse to the movement of the piston 46, and the second section 62 of the arm 44 to move downward towards the electrode 30.

In one embodiment, the torch handle 10 further includes a spring 64 coupled to the arm 44 of the first member 24. As shown, the spring 64 is oriented generally perpendicular to the movement of the piston 46, which causes the first section 60 of the arm to be biased in the direction generally transverse to the movement of the piston 46, and the second section 62 of the arm 44 to move towards the electrode 30. During use, the spring 64 applies a light force to the first member 24 sufficient enough to secure the electrode 30 between the nozzle 36 and the protrusion 32 when the jaw 22 is open.

Figure 4:
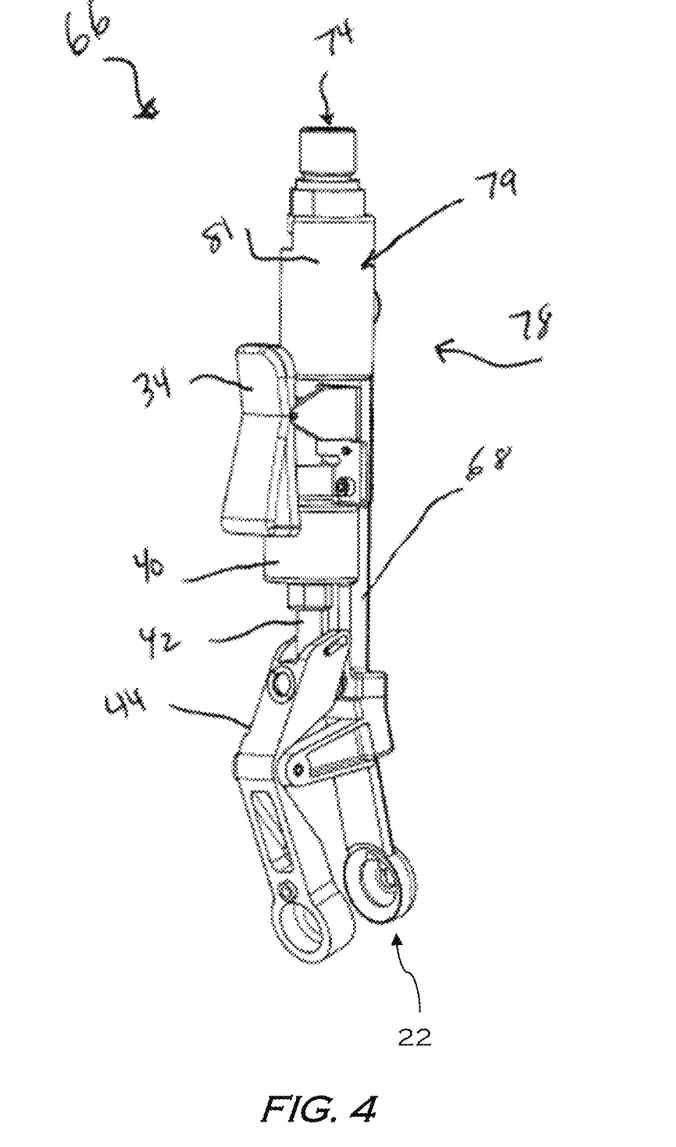
FIG. 4 is an isometric semi-transparent view of a system for distributing gas within the torch handle of FIG. 1 according to an exemplary approach.

Referring now to FIGS. 3A-4, a system 66 for pneumatically operating the jaw 22 by controlling distribution of a gas within the torch handle 10 according to exemplary embodiments will be described in greater detail. As shown, the system 66 includes the pneumatic cylinder 40 and a gas passageway 68 through the main housing 14, the gas passageway 68 including one or more exit orifices 31 (FIG. 1) disposed within the nozzle 36 of the second member 26 of the jaw 22. During use, gas under pressure released from exit orifices 31 passes alongside the electrode 30 to remove molten metal from the work surface in the area of the electric arc. In one embodiment, each orifice 31 is oriented parallel to the electrode 30 to maintain sufficient force and to effect the stream of gas acting on the work surface.

As shown, a supply of gas 72 for operating the torch handle 10 is directed through the main housing 14 and received at a gas inlet 74. The supply of gas 72 may be compressed air, which is delivered to a flow controller 78 for further distribution within the torch handle 10. In an exemplary embodiment, the flow controller 78 is a valve assembly 79 including a first valve 82 and a second valve 84, wherein the first valve 82 is disposed within a valve chamber 81 and configured to direct a gas flow 73 to the pneumatic cylinder inlet 50 via the first valve 82, or to the gas passageway 68 via the second valve 84 in response to a desired torch operational mode (e.g., "gouging" or "release") selectable via the switch 34. In one embodiment, the torch handle 10 may also include an "OFF" mode that shuts off the supply of gas 72.

In one embodiment, in the case that the gouging mode is selected, the gas flow 73 may be directed through the gas passageway 68, which decreases or maintains a relatively lower pressure within the chamber 48, and which slides the piston 46 towards the proximal end 20 of the torch handle 10, thus actuating the first member 24 of the jaw 22 towards the second member 26. In the case that the release mode is selected, the flow controller 78 may divert the gas flow 73 to the pneumatic cylinder 40, which directs the gas flow 73 to the chamber 48. A resultant pressure increase within the chamber 48 actuates the piston 46 towards the distal end 18 of the torch handle 10, which causes the first member 24 to move away from the second member 26.

In some embodiments, the first valve 82 and the second valve 84 of the valve assembly 79 are oriented perpendicular, or generally perpendicular, to one another. That is, a lengthwise central longitudinal axis 57 of the first valve 82 may be perpendicular to a lengthwise central longitudinal axis 59 of the second valve 84. As shown, the lengthwise central longitudinal axis 57 is generally perpendicular to a lengthwise axis (not shown) of the torch handle 10. By orienting one of the first valve 82 on its side relative to the second valve 84, the first valve 82 may be made larger, which improves performance of the torch handle 10 by increasing gas flow through the gas passageway 68. A larger valve oriented parallel to the lengthwise central longitudinal axis 59 of the second valve 84 may be impractical due to constraints on operator preferred handle size. In some embodiments, the first valve 82 has a length and a circumference that is greater than a length and a circumference of the second valve 84. The valve assembly 79 may include a greater or fewer number of valves. For example, multiple valves may be substituted for the first valve 82 in alternative designs.

In some embodiments, the switch 34 may be a rocker switch including a main body 33 and a lever arm 35 extending from the main body 33, the lever arm 35 for controlling operating each of the first and second valves 82, 84 of the valve assembly 79. As best shown in FIG. 3B, the main body 33 may extend outside of the main housing 14 of the torch handle 10 for access by a user, while the lever arm 35 extends into the torch handle, for example, perpendicular to the main body 33. The main body 33 may include a first end 37 and a second end 39, wherein the first or second ends 37, 39 may be depressed to cause the main body 33 to pivot about a pin 41, controlling the gas flow 73. In some embodiments, the pin 41 may be suspended or supported by a switch support 43.

The switch 34 may further include a cantilever arm 45 coupled to the main housing and in direct physical contact with a stem 100-A of second valve 84. The cantilever arm 45 is further coupled to a first side of the lever arm 35. A second side of the lever arm 35 is coupled to a stem 100-B of the first valve 82. During use, when the second end 39 of the switch 34 is depressed into a first cavity 47, the lever arm 35 rotates towards the stem 100-B of the first valve 82 and away from the cantilever arm 45. The lever arm 35 may bias the stem 100-B towards the proximal end 20 and into the first valve 82, as will be described in greater detail below. Inversely, when the first end 37 of the switch 34 is depressed into a second cavity 49, the lever arm 35 rotates towards the cantilever arm 45. A force applied to the free end of cantilever arm 45 causes the cantilever arm 45 to rotate and bias against the stem 100-A of the second valve 84; causing the stem 100-A to depress within the second valve 84, as will be described in greater detail below. A stem spring 51 may surround the stem 100-A of the second valve 84 to apply a spring force against the cantilever arm 45.

Figure 5:
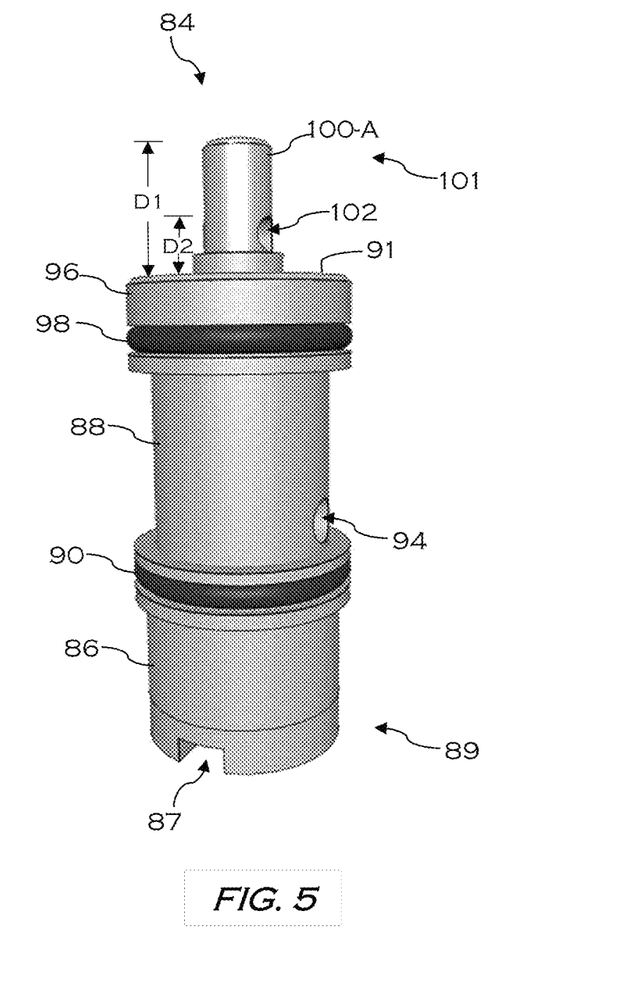
FIG. 5 is an isometric view of a valve of a flow controller within the torch handle of FIG. 1 according to exemplary approaches.

Referring now to FIG. 5, operation of the first valve 82 and the second valve 84 of the valve assembly 79 according to an exemplary embodiment will be described in greater detail. For the sake of simplicity, only the second valve 84 is shown. However, it'll be appreciated that the first valve 82 may operate with similar elements and in a similar way. In this embodiment, the second valve 84 represents a normally closed 3-way cartridge valve having a base section 86 including an inlet 87 at a first end 89 thereof, and a central section 88 separated from the base section 86 by an O-ring 90. As shown, the central section 88 includes a conduit 94 formed therethrough. In exemplary embodiments, the central section 88 and the conduit 94 are aligned with the pneumatic cylinder inlet 50 (FIGS. 3A-B). The second valve 84 further includes an upper section 96 separated from the central section 88 by an O-ring 98, and a stem 100-A disposed at a second end 101 thereof. In exemplary embodiments, the stem 100-A is configured to change a gas flow path when depressed and/or released. As shown, the stem 100-A may include an exhaust 102 for dispelling high pressure gas from the stem 100-A.

In exemplary embodiments, as described above, the switch 34 causes the cantilever arm 45 to engage the stem 100-A so as to cause the stem 100-A to be recessed to a desired depth within the second valve 84. For example, in the case that the second valve 84 is a three-position valve, the switch 34 may recess the stem 100-A a distance D1 relative to a top surface 91 of the upper section 96. In this first position, a passage (not shown) of the stem 100 aligns with the conduit 94 in the central section 88 of the first valve 82, 84 to expel gas radially therefrom. In another position, the switch 34 may recess the stem 100-A a distance D2 relative to the top surface 91 of the upper section 96 such that the exhaust 102 is recessed within the first valve 82 proximate the upper section 96 to prevent fluid flow from the exhaust 102 and to cause the passage of the stem to be misaligned with the conduit 94. In this position, gas within the second valve 84 is prevented from being released via the exhaust 102 and/or the conduit 94.

Figure 6A:
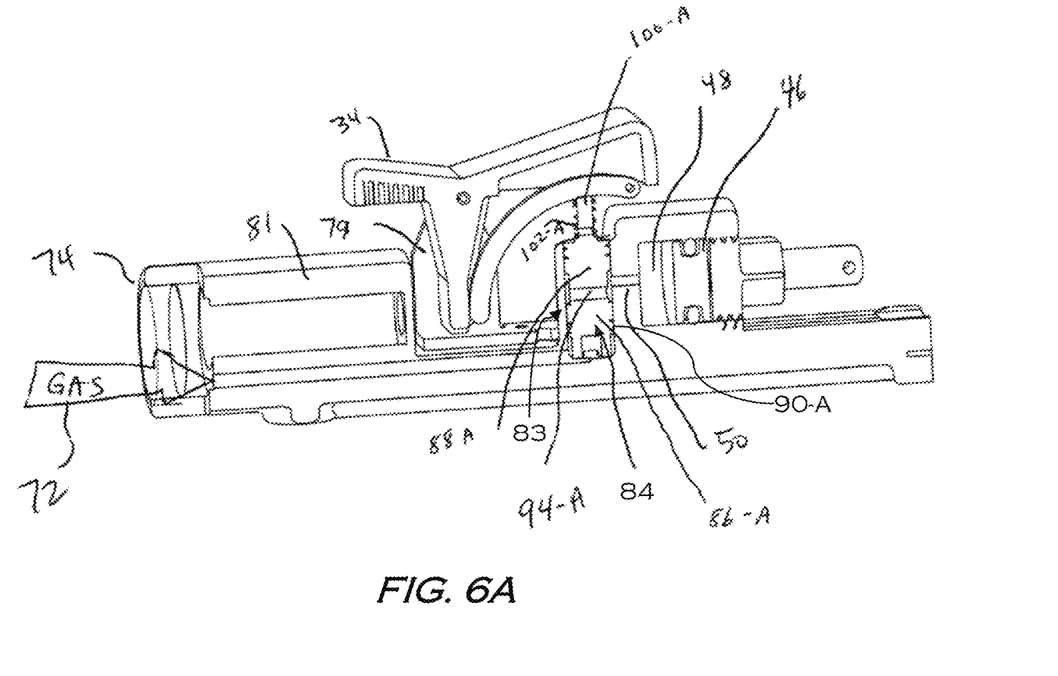
Figure 6B:
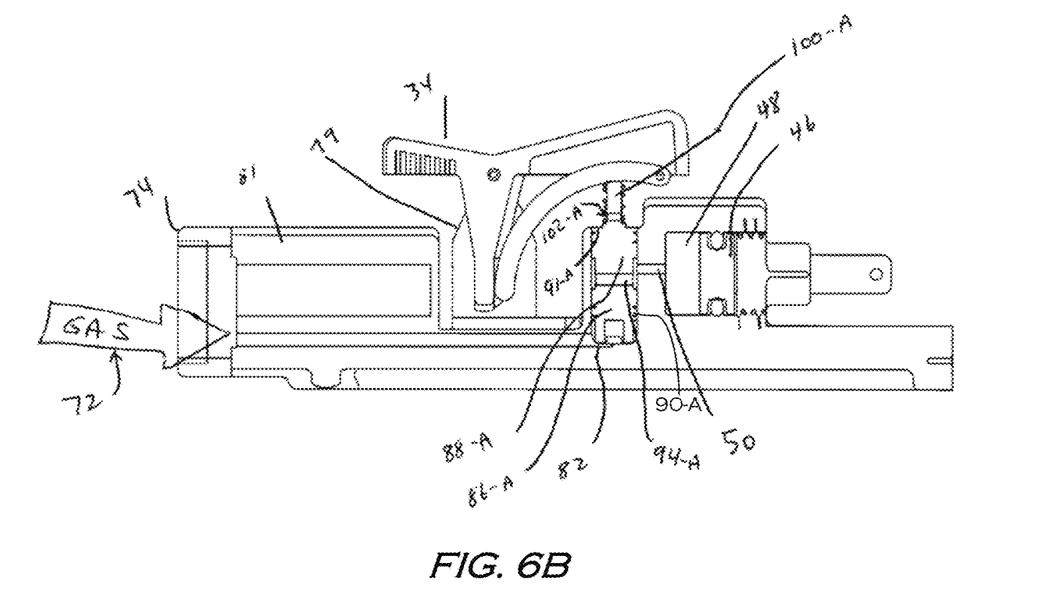

Referring now to FIGS. 6A-B, further operation of the valve assembly 79 according to exemplary embodiments will be described in greater detail. As shown, the valve assembly 79 includes the second valve 84 configured to receive the supply of gas 72 through the gas inlet 74 and deliver it to the chamber 48 via the pneumatic cylinder inlet 50 for the purpose of changing the relative positions of the first and second members of the jaw 22, as described above. In this embodiment, the supply of gas 72 passes through the gas inlet 74 and surrounds the base section 86-A of the second valve 84. To prevent gas from moving along an exterior surface of the second valve 82 toward the central section 88-A, the O-ring 90-A is provided. As shown, the O-ring 90-A forms a seal with an interior wall of a valve chamber 83. The gas is thus directed to the inlet 87 (FIG. 5) where, depending on the position of the stem 100-A, it may be directed through the conduit 94-A, and then through the pneumatic cylinder inlet 50. In the case that the gas is prevented from being expelled through the conduit 94-A, the gas is re-directed along the exterior of the base section 86-A towards the first valve 82.

During operation, to direct the gas to the chamber 48, the stem 100-A is depressed relative to the top surface 91-A of the first valve 82, and an opening (not shown) along the stem 100-A aligns with the conduit 94-A. The gas traverses an interior conduit (not shown) within the stem 100-A where it is expelled radially through the conduit 94-A. The gas surrounds the central section 88-A of the second valve 84, where it is confined by the lower O-ring 90-A, the upper O-ring 98-A, and the valve chamber 83. The gas may then enter the pneumatic cylinder inlet 50, where it is delivered to the chamber 48. The resultant pressure increase within the chamber 48 caused by the flow of gas actuates the piston 46 in a linear direction away from the second valve 84, which causes the first member of the jaw to move away from the second member of the jaw, for example, to allow for repositioning or replacement of the electrode between gouging operations.

Figure 7A:
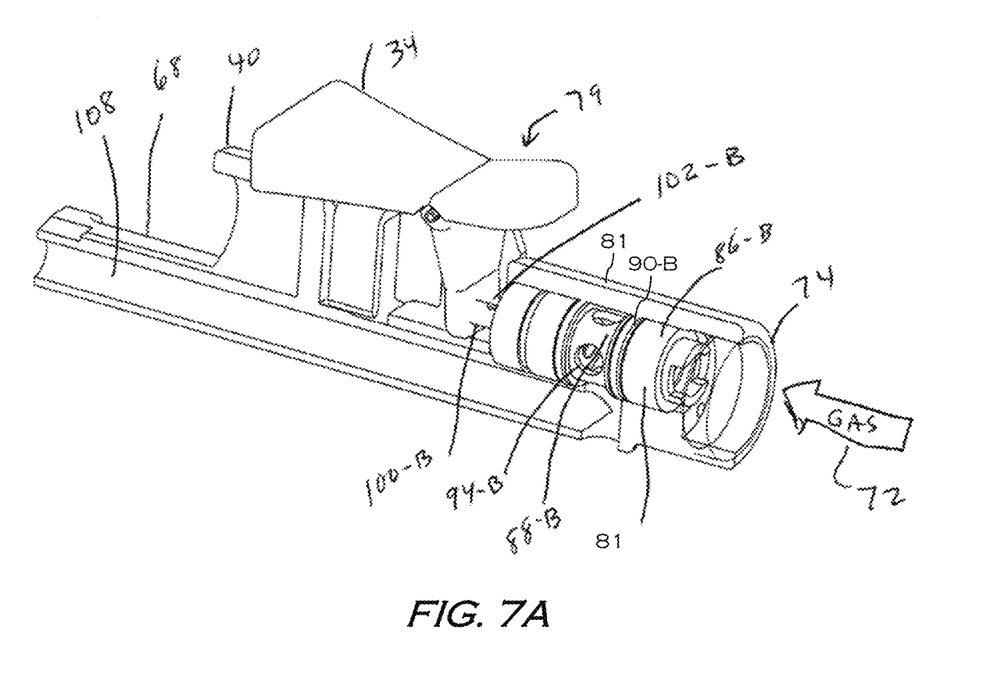
Figure 7B:
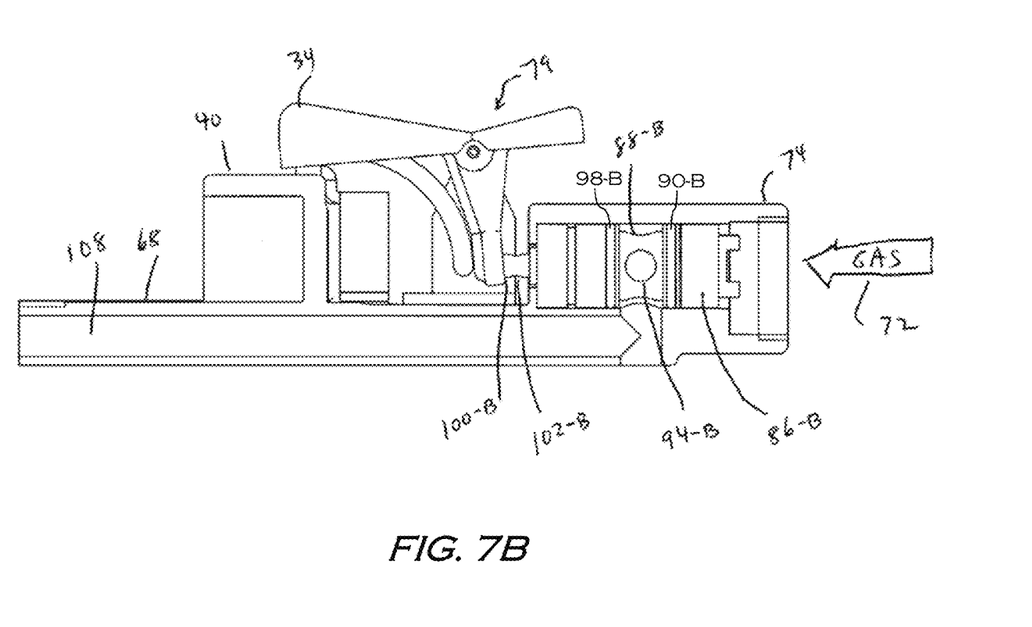

Referring now to FIGS. 7A-B, operation of the valve assembly 79 will be described in greater detail. As shown, the valve assembly 79 includes the first valve 82 configured to receive the supply of gas 72 through the gas inlet 74 and deliver it to the gas passageway 68 for the purpose of providing gas to the nozzle 36 (FIGS. 1-3), as described above. More specifically, gas is directed through the gas inlet 74 towards the valve chamber 81 where it surrounds the base section 86-B of the first valve 82. The O-ring 90-B forms a seal with a wall of the valve chamber 81 that extends around the circumference of the first valve 82 to prevent the supply of gas from flowing along the exterior of the first valve 82 toward the central section 88-B. The gas may thus enter the inlet 87 (FIG. 5) where, depending on the position of the stem 100-B, it may be directed through the conduit 94-B. In the case that the gas is prevented from being expelled through the conduit 94-B, the gas is re-directed along the exterior of the base section 86-B towards the second valve 84.

To direct the gas to the gas passageway 68, the stem 100-B is depressed relative to the top surface 91-B of the first valve 82, and an opening (not shown) along the stem 100-B aligns with the conduit 94-B. The gas traverses an interior conduit (not shown) of the stem 100-B where it is expelled radially through the conduit 94-B. The gas thus surrounds the central section 88-B of the first valve 82 where it is confined by the lower O-ring 90-B, the upper O-ring 98-B, and the valve chamber 81. The gas may then enter an interior conduit 108 of the gas passageway 68 where it is delivered to the nozzle 36 (FIGS. 1-3). In exemplary embodiments, pressure within the gas passageway 68 increases due to the flow of the gas, which causes a resultant pressure decrease within the chamber 48 of the pneumatic cylinder 40. This decrease in pressure allows the piston 46 to actuate within the chamber 48 in a direction towards the second valve 84, which causes the first member of the jaw to move towards the second member of the jaw.

Figure 8:
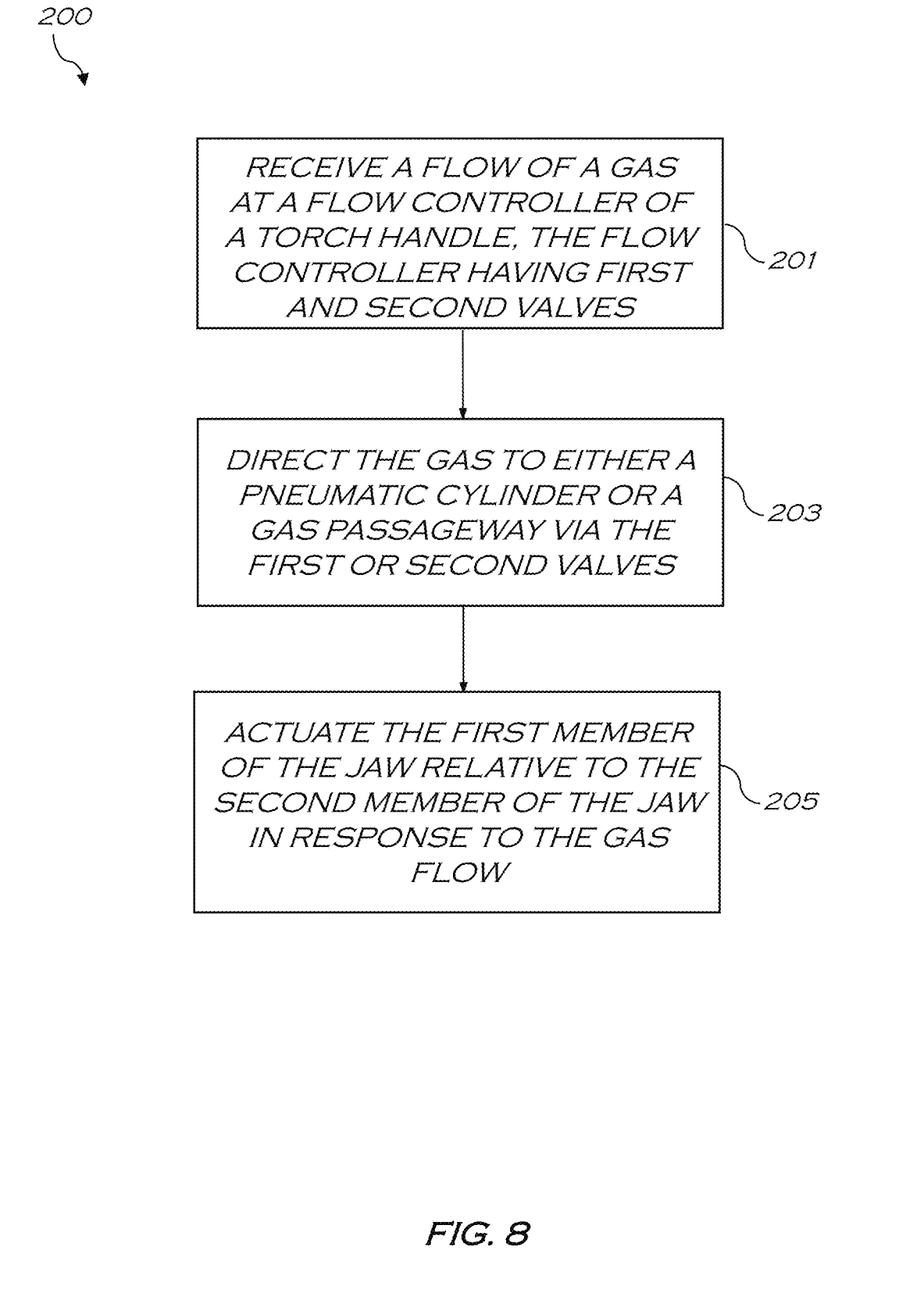
FIG. 8 is a flow chart illustrating an exemplary method of operating a gouging torch having a torch handle with a pneumatically operated jaw.

Referring now to FIG. 8, a method 200 for operating a torch handle according to exemplary embodiments will be described in greater detail. Method 200 includes receiving a flow of a gas at a flow controller of the torch handle, as shown at block 201. In some embodiments, the gas may be compressed air, which is provided to the flow controller via a gas inlet of the torch handle. In some embodiments, the flow controller is a valve assembly including first and second valves. In some embodiments, the first and second valves are oriented perpendicular to one another.

The method 200 further includes directing a flow of the gas to either a pneumatic cylinder disposed within a main housing via a second cylinder, or a gas passageway via a first cylinder, as shown at block 203. In some embodiments, the pneumatic cylinder includes a piston have a shaft configured to actuate a first member of a jaw. In some embodiments, the gas passageway extends through the main housing to an exit orifice disposed within a second member of the jaw. In some embodiments, a switch is coupled to the flow controller for allowing user-operation of the flow controller. In some embodiments, the shaft of the piston is coupled to an arm, which is partially disposed within the first member and configured to actuate the first member.

The method 200 further includes actuating the first member of the jaw relative to the second member of the jaw in response to the flow of the gas, as shown in block 205. In some embodiments, the first member is actuated towards the second member when the flow of gas is directed through the gas passageway, and actuated away from the second member when the flow of gas is directed to the pneumatic cylinder.

As will be appreciated, it is advantageous to replace a manual lever with a pneumatic cylinder and valve assembly, as described herein, to aid the opening and closing of the torch jaw for carbon electrode insertion and repositioning. Furthermore, as compressed air flows to the nozzle during a gouging process, it is advantageous to include a valve assembly, as described herein, for diverting the compressed air to the pneumatic cylinder to open the jaw. It will be further appreciated that use of the valve assembly and pneumatic cylinder in place of a manual level advantageously allows for a reduction in handle diameter, which improves user ergonomics and reduces user fatigue.

While the present disclosure has been described with reference to certain approaches, numerous modifications, alterations and changes to the described approaches are possible without departing from the sphere and scope of the present disclosure, as defined in the appended claims. Accordingly, it is intended that the present disclosure not be limited to the described approaches, but that it has the full scope defined by the language of the following claims, and equivalents thereof. While the disclosure has been described with reference to certain approaches, numerous modifications, alterations and changes to the described approaches are possible without departing from the spirit and scope of the disclosure, as defined in the appended claims. Accordingly, it is intended that the present disclosure not be limited to the described approaches, but that it has the full scope defined by the language of the following claims, and equivalents thereof.

What is claimed is:

1. A system for distributing gas within a torch handle, comprising:

a pneumatic cylinder disposed within a main housing, the pneumatic cylinder including a shaft for actuating a first member of a jaw relative to a second member of the jaw;
a gas passageway through the main housing, the gas passageway including an exit orifice disposed within the second member of the jaw; and
a valve assembly including a first valve operable to deliver a gas to the pneumatic cylinder and a second valve operable to deliver the gas to the gas passageway and the exit orifice, wherein the first valve and the second valve are oriented perpendicular to one another.

2. The system of claim 1, further comprising a gas inlet for delivering a supply of the gas to the valve assembly.

3. The system of claim 1, the pneumatic cylinder comprising:
a piston within a chamber; and
a pneumatic cylinder inlet for delivering the gas to the chamber.

4. The system of claim 1, further comprising a switch coupled to the valve assembly for providing user-operation of the system.

5. The system of claim 1, wherein the first valve has a length and a circumference greater than a length and a circumference of the second valve.

6. The system of claim 1, further comprising a switch coupled to the valve assembly for providing user-operation of the system, the switch comprising:
a main body extending partially outside of the main housing for actuation by a user; and
a lever arm extending from the main body, wherein the lever arm extends into an interior of the torch handle, and wherein the lever arm is in direct physical contact with at least one of the first and second valves.

7. The system of claim 1, the first member comprising an arm including a slot for slidably receiving the shaft of the pneumatic cylinder to actuate the first member of the jaw relative to the second member of the jaw.

8. The system of claim 6, wherein the main body extends partially outside of the main housing for access by the user, and wherein while the lever arm extends into an interior of the main housing.

9. The system of claim 6, the switch further comprising a cantilever arm coupled to the main housing, wherein the cantilever arm is in direct physical contact with a stem of the second valve, and wherein rotation of the cantilever arm actuates the stem of the second valve.

10. The system of claim 7, further comprising a spring coupled to the arm of the first member.

\* \* \* \* \*